April 12, 1966 J. A. JIMENEZ ET AL 3,245,356
TORTILLA OVEN
Filed July 6, 1964 2 Sheets-Sheet 1
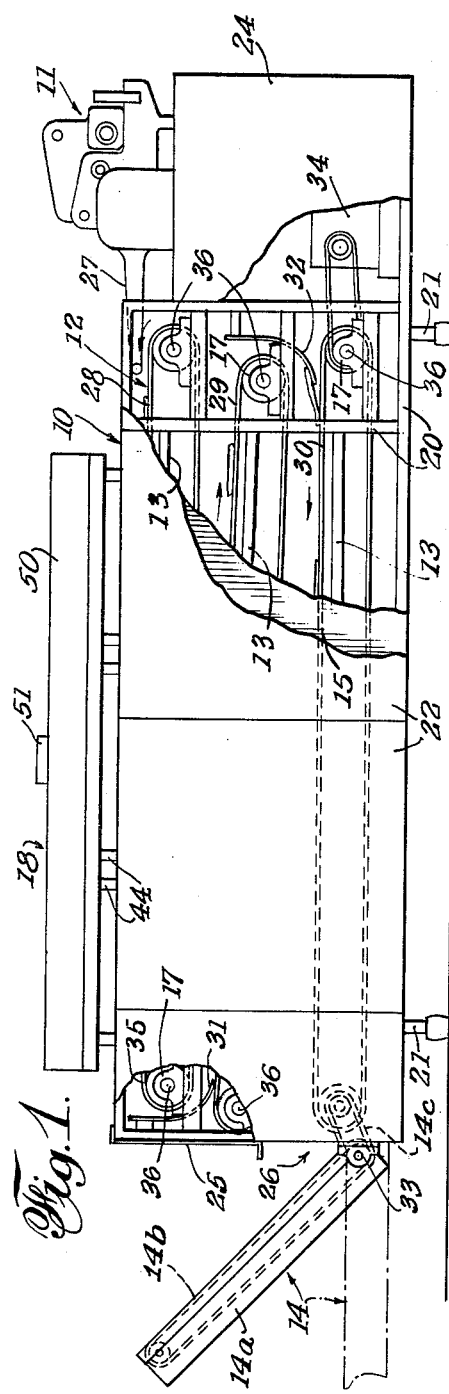
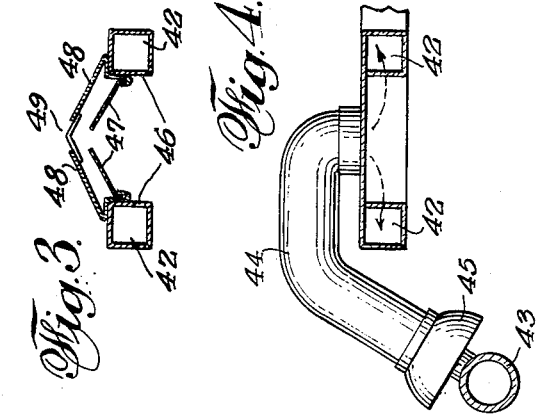
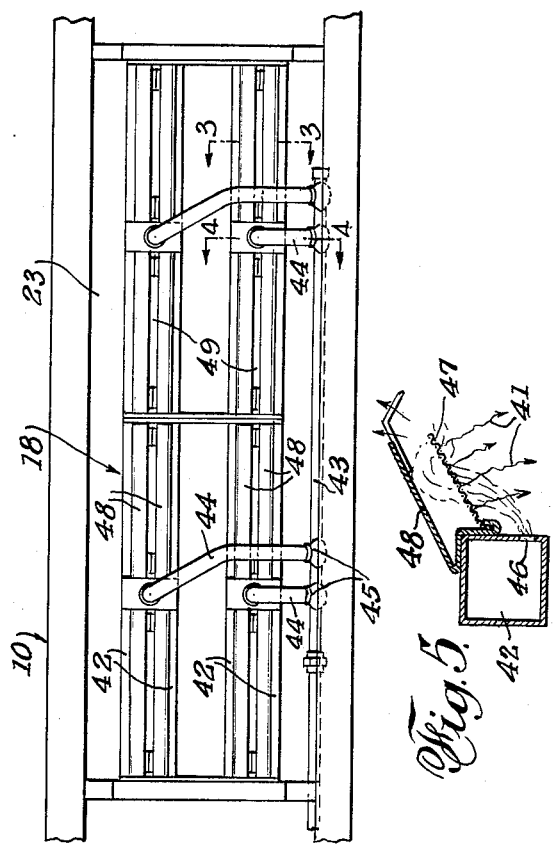
INVENTORS
JAMES A. JIMENEZ
HAROLD H. OLMSTED
BY C. G. Stratton
ATTORNEY April 12, 1966 J. A. JIMENEZ ET AL 3,245,356
TORTILLA OVEN
Filed July 6, 1964 2 Sheets-Sheet 2
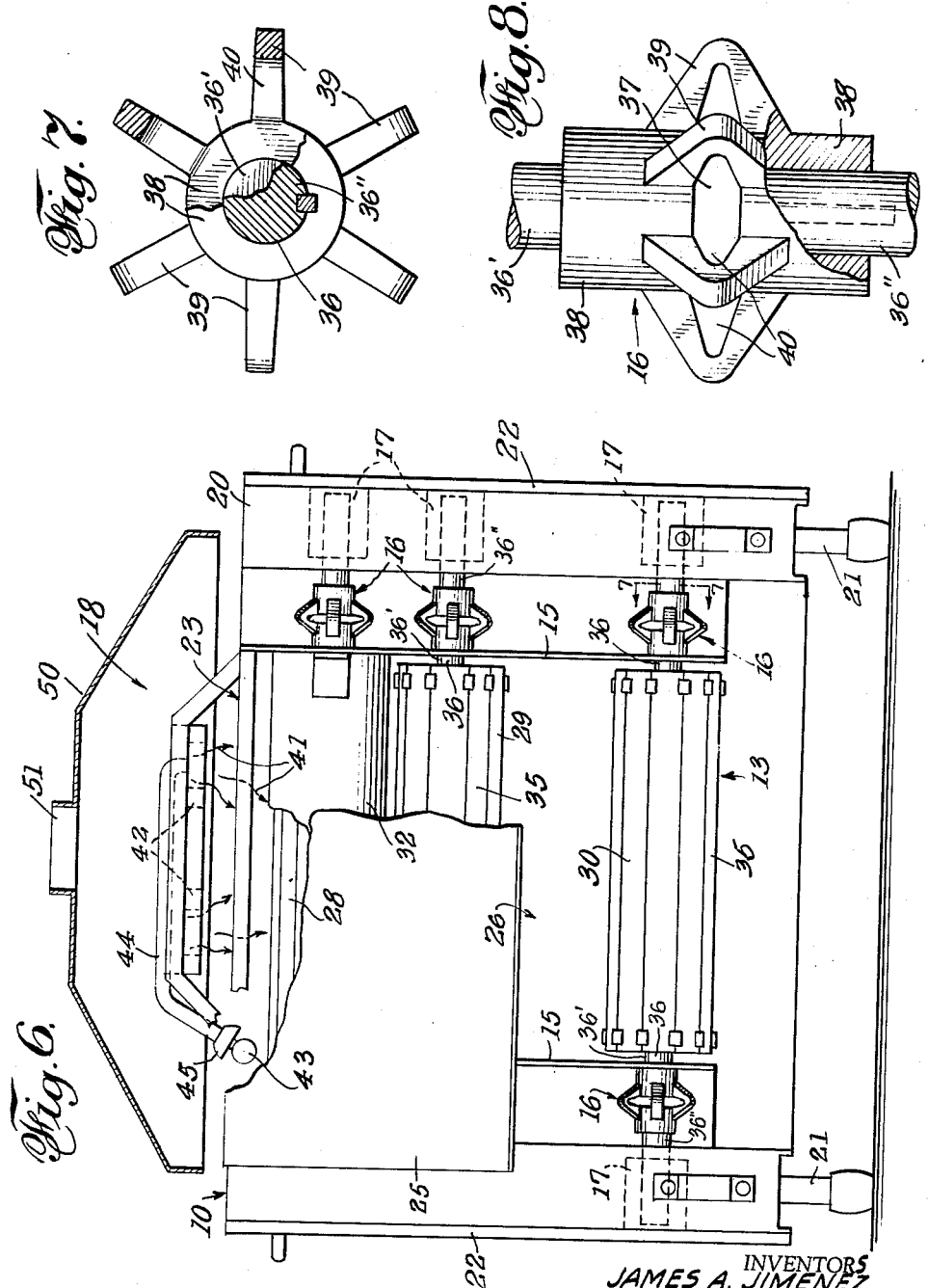
INVENTORS
JAMES A. JIMENEZ
HAROLD H. OLMSTED
BY C. G. Stratton
ATTORNEY

United States Patent Office 3,245,356
Patented Apr. 12, 1966

3,245,356
TORTILLA OVEN
James A. Jimenez and Harold H. Olmsted, both of
6252 N. Hart Ave., Temple City, Calif.
Filed July 6, 1964, Ser. No. 380,331
4 Claims. (Cl. 107—57)

This invention relates to an oven for baking flat items, such as tortillas.

An object of the present invention is to provide an oven that bakes tortillas uniformly on both sides thereof.

Another object of the invention is to provide an oven, as above characterized, that provides baking heat on both surfaces of the tortillas as the same are initially and successively fed into the oven, all the surfaces of the tortillas, thereby, being prebaked to sear or seal the same. Baking of the tortillas is then continued in a generally conventional manner until discharge of the baked item from the oven.

A further object of the invention is to provide an oven, as above, in which the tortillas are moved back and forth from entry feed to discharge on conveyors, means being provided for preventing oven heat from deleteriously affecting the bearings that mount said conveyors.

A still further object of the invention is to provide a radiant heater of the infra red type that is directional to supply tortilla sealing heat from above in combination with baking heat from beneath.

This invention also has for its objects to provide such means that are positive in operation, convenient in use, easily installed in a working position and easily disconnected therefrom, economical of manufacture, relatively simple, and of general superiority and serviceability.

The above objects are realized in an oven structure that conventionally provides baking heat to the tortillas by heating the runs of the conveyors on which they are carried, applies radiant heat from above on the uppermost conveyor to seal the top surface of the tortillas as baking thereof is begun, and provides for dissipation of the heat applied in such a manner that the bearings on which the conveyors are mounted, are subjected to temperatures much lower than oven temperature, and but a few degrees above ambient temperature.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a side elevational view, partly broken away, of a tortilla oven according to the present invention.

FIG. 2 is an enlarged top plan view of an infra red heater used to supply tortilla sealing heat.

FIGS. 3 and 4 are further enlarged cross-sectional views as taken on the respective lines 3—3 and 4—4 of FIG. 2.

FIG. 5 is a still further enlarged and detail sectional view of the left-hand portion of FIG. 3.

FIG. 6 is a view taken from the left end of FIG. 1, and shown partly in section and at a scale approximating the scale of FIG. 2.

FIG. 7 is an enlarged cross-sectional view as taken on the line 7—7 of FIG. 6.

FIG. 8 is a partly broken top plan view of the means shown in FIG. 7.

The oven that is illustrated comprises, generally, an oven housing 10, a feed head 11 mounted on the housing at one end thereof for feeding tortillas, a set of conveyors 12 that are fed by the feed head 11, means 13 to heat the tortillas on the conveyors 12 to bake the same, a discharge conveyor 14 for receiving tortillas baked within the oven housing and transported from feed to discharge by said conveyors 12, heat insulating walls 15 on opposite sides of the conveyors to confine baking heat to the space occupied by the conveyors, a set of heat dissipators 16 to intercept conduction heat from the conveyors to keep such heat from affecting the conveyor bearings 17, and a tortilla-searing infrared heater 18 mounted on the oven housing.

The oven housing comprises a frame 20 of parallelepiped form and supported on legs 21. The sides of the frame 20 are covered by panels 22 which are removable for ready access to the oven interior. The frame 20 is open at the top 23, is closed at one end by a panel-enclosed extension 24, and at the opposite end by a heat guard panel 25 extending partly down said end and leaving an opening 26 for discharge of baked tortillas.

The feed head 11 does not, per se, form part of this invention, the same merely forming discs of flat dough of tortilla size and form. Said head has a conveyor belt 27 that terminates at the top of one end of the oven housing 10, as can be seen in FIG. 1.

In this case, three endless conveyors 28, 29 and 30, comprise the set of conveyors 12 the same being disposed lengthwise in the oven housing one above the other from the top down. As shown by the arrows in FIG. 1, the top conveyor 28 has its upper tortilla-receiving run moving toward the opposite end of the housing 10, the intermediate conveyor 29 has a reverse movement, and the lower conveyor 30 moves in the same direction as conveyor 28. It will be evident that tortillas deposited on the top run of the conveyor 28 will be transported to the opposite end of said conveyor and will fall from said end into engagement with a turnover shoe 31 which inverts the tortillas while depositing them onto the intermediate conveyor 29 for transport back to the feed end of the oven. There, a turnover shoe 32 again inverts the tortillas and deposits the same on the lower conveyor 30 for transport to the discharge end of the oven where the same are discharged by gravity upon the discharge conveyor 14 which may be adjusted to any appropriate angle on its pivots 33 adjacent the far end of the lower conveyor 30. The conveyor 14 is shown as a frame 14a in which a conveyor belt 14b is mounted, the latter being driven by the lower conveyor 30 by a belt 14c. The belt 14b may be independently driven. The two positions of the conveyor 14 are indicative of the angular adjustability thereof so the discharge end may be disposed at a desired level. The support for the discharge end of the conveyor 14 is not shown; the same may be rested upon a table, otherwise propped up from beneath, or held up at various levels by a chain or cable from above. The set of conveyors above described may be driven from a motor 34 housed in the extension 24 by suitable endless drives, one of which is illustrated in FIG. 1.

As can be seen in both FIGS. 1 and 6, the conveyors 28–30 comprise articulated belts 35 that are trained around drums, wheels or pulleys on shafts 36 which are journalled in the bearings 17.

The tortillas on said conveyor belts 35 are baked by heat provided by the burners 13 which are here shown as disposed beneath the top runs of the belts of conveyors 28, 29 and 30. This heat, regardless how generated, not only heats said belts, but also creates an overall baking heat in the oven that, in practice, is approximately 700° F. As a consequence, the shafts 36, usually metallic for strength and wear resistance, conduct heat to the bearings 17 at such temperatures that the latter, due to an uncommon range of expansion of shaft and bearing parts may be seriously injured or destroyed.

The heat insulating walls 15 will confine most of the oven heat to the area in which the conveyors 13 are disposed and will, in some measure, be helpful to reduce the heat circulating around the bearings 17. However, these walls cannot prevent heat conduction by the shafts 36 to the bearings 17. The heat dissipators 16 are used for this purpose, the same constituting metallic elements that connect the shaft portion 36' on which the belts 35 are mounted, and the axially aligned shaft portions 36" which are journalled in the bearings 17. As seen best in FIGS. 7 and 8, said shaft portions 36' and 36" are spaced as at 37. Any heat conduction that takes place must be through the dissipator 16 of each shaft 36.

Each dissipator comprises axially spaced collars 38 affixed to the shaft portions 36' and 36", and radial fins 39 which integrally connect said collars and are formed to be thin and fin-like to offer small metal bases with relatively large surface area. Six fins are shown, the sum of the thicknesses of said fins being sufficient to provide a torque connection between the collars that is of ample strength for supporting and driving the conveyors. It will be noted that said fins have such radial extent as to form air agitators when the conveyors are operating. Also, by omitting the metal from the spaces 40 of the fins, the heat conduction path is materially increased, affording ample time for heat exchange between the fins and the surrounding air.

The infrared heater 18 directs radiant heat rays 41 (FIGS. 5 and 6) onto the upper face of the top run of the top conveyor 28, and therefore, on the top faces of tortillas on said top run. Said heater is shown as parallel conduits or tubes 42 which receive gas fuel from a supply line 43 by way of pipes 44 in which air-mixing ports 45 may be provided. Said tubes 42 have gas outlets or orifices 46 that are directed into the space between said tubes.

The heater 18 also includes infrared burner screens 47 in which the radiant rays 41 are generated by the combustion of gas fuel supplied from beneath through outlets 46 of conduits 42. The screens are carried on the two tubes 42 and slope upwardly toward and are spaced from each other, as in FIG. 3. Said screens are advantageously woven of a nickel chrome alloy such as Nichrome wire. Deflector plates 48 above and generally parallel to the screens 47 not only insure that the entire area of each screen generates radiant heating rays, but also serve as deflectors that direct the rays downwardly and substantially uniformly, insuring a maximum of radiation from the incandescent screens 47 resulting in increased temperature as well as increased radiation. The deflectors are spaced to provide a vent 49 for passing exhaust gases into a hood 50 which, in turn, vents to atmosphere at 51. The vent 49, opening upwardly, draws the gases in the spaces between the screens 47 and the deflector 48 according to the upwardly directed arrows of FIG. 5. Said vent, being disposed between the ends of said screens and deflectors, receives the gases from orifices 46 in an upward direction biased by the sloping deflectors toward the vent 49, as shown by the wavy lines. Said gases are, therefore, spread over the surfaces of the screens 47 in their movement toward the vent 49. The inner upper edges of the screens 47 and deflectors 48 are spaced apart to provide an unobstructed flow toward the vent which induces spread of the gases over the entire surfaces of both screens with similar effect on both screens.

The infrared heater is preferred for reasons of cleanliness and especially because the heat thereof is applied in a downward direction onto the exposed faces of tortillas on the top conveyor. Other radiant heaters, gas or electric powered may be adopted for this purpose.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A tortilla oven comprising, in combination:
   (a) an oven housing having a discharge end,
   (b) a set of generally horizontal conveyors, one above the other and each having a tortilla-supporting top run to move tortillas on said runs back and forth toward the discharge end of the housing,
   (c) a heater disposed beneath each conveyor run to heat the same and bake torillas disposed thereupon,
   (d) means at the discharge ends of the upper and intermediate conveyors to invert tortiallas discharged from a conveyor to one therebeneath, and
   (e) a radiant heater mounted on the top of the oven housing above the topmost conveyor to direct tortilla-sealing heat on tortillas disposed on the top conveyor while the same are subject to baking heat from the heater therebeneath,
   (f) said radiant heater comprising a pair of mesh screens mounted along the longitudinal edges of the top conveyor in opposed upwardly inclined relation,
   (g) gas conduits mounting said screens and having gas orifices beneath the screens to feed heating gas to the under sides of the screens,
   (h) deflector plates above and spaced from said screens to spread the gases passing through the screens while buring over the entire surfaces of the screens, said deflector plates being arranged in opposed upwardly inclined relation generally parellel to said mesh screens and having inner marginal edges spaced from each other to form a fumes-venting gap therebetween.

2. A tortilla oven comprising, in combination:
   (a) an oven housing having a discharge end,
   (b) a set of generally horizontal conveyors, one above the other and each having a tortilla-supporting top run to move tortillas on said runs back and forth toward the discharge end of the housing,
   (c) a heater disposed beneath each conveyor run to heat the same and bake tortillas disposed thereupon,
   (d) means at the discharge ends of the upper and intermediate conveyors to invert tortillas discharged from a conveyor to one therebeneath,
   (e) an infrared heater mounted above the topmost conveyor and including gas-heated screens of a nickel chrome alloy to radiate infrared rays toward the upper surfaces of tortillas disposed on said topmost conveyor while said tortillas are subject to baking heat from the heater therebeneath,
   (f) the conveyors having bearing-mounted support shafts subject to the heat of said heaters,
   (g) each shaft, between its bearing and conveyer, being divided to form spaced aligned shaft portions,
   (h) a metal collar fixedly mounted on each shaft portion, said collars being spaced from each other,
   (i) a plurality of spaced radial fins integrally formed with and connecting said collars, and
   (j) said fins extending outwardly from said collars and having concave inner faces defining inner recesses spaced outwardly of said shaft portions and opening on the space between the collars to provide a heat conduction path along each fin that extends around said inner recesses to eliminate heat damage to said bearing and to agitate the air around the collars and the portions of the shaft on which the collars are mounted.

3. In a tortilla oven having tortilla conveyors mounted on shafts subject to baking heat applied to the tortillas, and said shafts being journalled in bearings, (a) each shaft, between its bearing and conveyor, being divided to form spaced shaft portions, and
(b) a metal heat dissipator connecting said shaft portions and provided with cooling fins that lessen the transmission of heat from one shaft portion to the other,
(c) said fins being connected at their ends to said shaft portions and extending outwardly therefrom, said fins being formed with concave inner faces defining inner recesses spaced outwardly of said shaft portions and opening on the space between the ends of said shaft portions to provide a heat conduction path along each fin that extends around said inner recesses to eliminate heat damage to said bearing and to agitate the air around the spaced portions of said shafts.

4. In a tortilla oven having tortilla conveyors mounted on shafts subject to baking heat applied to the tortillas, and said shafts being journalled in bearings,
(a) each shaft, between its bearing and conveyor, being divided to form spaced aligned shaft portions,
(b) a metal collar fixedly mounted on each shaft portion, said collars being spaced from each other, and
(c) a plurality of spaced radial fins integrally formed with and connecting said collars,
(d) said fins extending outwardly from said collars and having concave inner faces defining inner recesses spaced outwardly of said shaft portions and opening on the space between the collars to provide a heat conduction path along each fin that extends around said inner recesses to eliminate heat damage to said bearing and to agitate the air around the collars and the portions of the shaft on which the collars are mounted.

References Cited by the Examiner

UNITED STATES PATENTS

| | | | |
|---|---|---|---|
| 441,961 | 12/1890 | Mohring | 107—57 |
| 462,921 | 11/1891 | Gibbons. | |
| 784,854 | 3/1905 | Grace | 107—57 |
| 1,277,125 | 8/1918 | Rice | 107—57 |
| 1,986,219 | 1/1935 | Richards | 308—77 |
| 2,112,309 | 3/1938 | Santillan | 99—423 X |
| 2,861,524 | 11/1958 | Peralta | 107—60 |
| 3,050,296 | 8/1962 | Trimborn | 263—6 |
| 3,114,410 | 12/1963 | Schneider | 126—92 X |

WALTER A. SCHEEL, *Primary Examiner.*

ROBERT E. PULFREY, JOSEPH SHEA, *Examiners.*